US006703143B2

(12) United States Patent
Kihira et al.

(10) Patent No.: US 6,703,143 B2
(45) Date of Patent: Mar. 9, 2004

(54) METAL FOIL EXCELLENT IN ELECTRICAL CONTACT STABILITY

(75) Inventors: Hiroshi Kihira, Futtsu (JP); Masao Kikuchi, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/239,630

(22) PCT Filed: Mar. 23, 2001

(86) PCT No.: PCT/JP01/02372

§ 371 (c)(1), (2), (4) Date: Sep. 20, 2002

(87) PCT Pub. No.: WO01/71740

PCT Pub. Date: Sep. 27, 2001

(65) Prior Publication Data

US 2003/0091854 A1 May 15, 2003

(30) Foreign Application Priority Data

Mar. 23, 2000 (JP) ....................................... 2000-081315

(51) Int. Cl.[7] ........................... B32B 3/00; B32B 15/18; B32B 15/20

(52) U.S. Cl. ....................... 428/606; 428/687; 428/674; 428/685

(58) Field of Search ................................ 428/606, 687, 428/674, 681, 685, 612; 174/126.1

(56) References Cited

U.S. PATENT DOCUMENTS

| | | | | | |
|---|---|---|---|---|---|
| 4,775,599 | A | * | 10/1988 | Matsuoka et al. | 428/600 |
| 6,419,149 | B1 | * | 7/2002 | Yano et al. | 228/235.1 |
| 6,475,638 | B1 | * | 11/2002 | Mitsuhashi et al. | 428/606 |
| 2001/0051282 | A1 | * | 12/2001 | Yates et al. | 428/607 |

FOREIGN PATENT DOCUMENTS

| | | | |
|---|---|---|---|
| JP | 62-143322 | | 6/1987 |
| JP | 08-045409 | * | 2/1996 |
| JP | 10-40761 | | 2/1998 |
| JP | 63-186020 | | 11/1998 |

* cited by examiner

*Primary Examiner*—Michael La Villa
(74) *Attorney, Agent, or Firm*—Kenyon & Kenyon

(57) ABSTRACT

The present invention provides a metal foil excellent in electrical contact stability, and low in cost, by eliminating plating processes. Specifically, the present invention is a metal foil excellent in electrical contact stability characterized by having a surface roughness wherein the ratio Ra/Sm between the arithmetic average of roughness Ra and the average interval Sm of concavities and convexities is 0.001 or more, which average values are obtained by measuring the roughness in the direction in which the average interval Sm of the concavities and convexities on the surface is smallest. It is preferable that the material of the metal foil is stainless steel or phosphor bronze.

1 Claim, No Drawings

METAL FOIL EXCELLENT IN ELECTRICAL CONTACT STABILITY

TECHNICAL FIELD

The present invention relates to a metal foil excellent in electrical contact stability, used as the material of a metal disc spring for a keypad, a tactile switch, etc. of an electronic device, in a cable terminal board of an electric signal transmission system or the like.

BACKGROUND ART

Keypads for cellular phones and tactile switches for various kinds of electronic devices, wherein miniaturization and weight reduction are advancing to the extreme, must provide a feeling of a sharp click when they are pushed. Therefore, for keypads and tact switches, thin and electrically conductive metal disc springs, which have the function of switching a circuit by making them directly contact with or detach from a metal pattern formed on a printed circuit board or a switch substrate, are used.

The main function of keypads and tactile switches used for cellular phones and various kinds of electronic devices is to transmit signals to microprocessors, digital circuits or the like contained in the devices. When a circuit is closed by pushing a switch having poor electrical contact stability, a voltage fluctuation beyond the threshold values of an Hi potential and an Lo potential occurs owing to the fluctuation of resistance or the like at the contact portion, and this leads to an incorrect recognition as to how many times the switch has been pushed. In other words, it is an essential requirement of a switch of this type to have a very small voltage alteration when it is closed.

Screw type cable terminal boards have so far been widely used for electric signal transmission systems but, for the ease of cable connection, pressure contact type terminal boards using a springy metal ribbon are being used. When the electrical contact stability of this kind of terminal is hindered, noise is generated, leading to various kinds of malfunctions.

Phosphor bronze or SUS 301 stainless steel, which are highly springy, have conventionally been used as the materials of a metal spring for an electrical contact. However, the problem here is that, when a disc spring formed of a foil produced from such a metal is used in a switch, sufficient electrical contact stability is not secured. Therefore, a foil produced from such a metal has been used after being plated with a metal such as gold, silver and nickel.

One of known technologies attempting to solve the problem is a "Stainless Steel Contact Material for Electronic Components and Method of Producing the Same" disclosed in Japanese Unexamined Patent Publication No. S63-137193. The publication discloses a method of producing a stainless steel contact material for electronic components excellent in corrosion resistance, wear resistance and springiness by plating the surface of a stainless steel substrate, sequentially, with Ni, Cu, Ni and Au alloy, so that each plating has a prescribed thickness.

According to the publication, the method is specifically as follows. Firstly, for the purpose of improving the adhesiveness of the subsequent Cu plating, a Ni plating layer 0.05 to 0.5 μm in thickness is formed on the surface of a stainless steel substrate, by electrolysis, using an electrolyte containing $NiCl_2$ and free HCl and using the stainless steel substrate as the cathode. Secondly, for the purpose of obtaining electrical conductivity, a Cu plating layer 2 to 50 μm in thickness is formed thereon, by electrolysis, using an electrolyte containing $CuSO_4$ and free $H_2SO_4$. Thirdly, for the purpose of protecting the Cu layer, a Ni plating layer 0.1 to 5 μm in thickness is formed thereon, by electrolysis, using an electrolyte containing $NiSO_4$ and $NiCl_2$.

Finally, for the purpose of improving wear resistance and corrosion resistance of a contact portion, an Au alloy plating layer 0.05 to 1 μm in thickness is formed, by electrolysis, using an electrolyte containing $KAu(CN)_2$ and salt of metals, except Au, such as Ni and Co with sulfamic acid.

However, the method according to the publication requires complicated manufacturing processes as described above and, thus, is costly. Therefore, it is considered desirable to apply the plating only to a local contact portion.

DISCLOSURE OF THE INVENTION

As explained above, when a springy metal material is used as an electrical contact material without surface treatment, the electrical stability of a contact point is hindered. As a common countermeasure, plating with a metal, such as gold, silver and nickel, which hardly forms an oxide film has so far been applied, but this inevitably leads to the drawback of a high material cost.

The object of the present invention is to provide a metal foil excellent in electrical contact stability, which does not require plating and is capable of reducing cost by eliminating plating processes.

Phosphor bronze or stainless steel is used as a springy metal for the switches but an oxide film forms naturally on the surface of the metal when the metal is exposed to the atmosphere and, as a result, contact resistance is generated. In addition, since electrical contact has so far been established by pressing a smooth metal surface to a counterpart metal surface, the density of contact points per unit area has been low, the state of the contacts with an oxide film between has been disturbed by slight vibrations and so on, and, as a result, a large and rapid fluctuation of the contact resistance has been generated and the electrical contact stability has been hindered.

In view of the above situation and based on the facts that the formation of a very thin oxide film on the surface of a metal material was a natural phenomenon which was difficult to control and that the electrical contact stability could be improved by increasing the pressing force even when an oxide film was formed, the present inventors have found that good electrical contact stability could be obtained even under a light pressing force by increasing the density of contact points per unit area and that, to realize this, the ratio between the average interval of concavities and convexities in surface roughness and the arithmetic average of roughness Ra was important. The present invention was established based on these findings.

The gist of the present invention for solving the above problem is as follows:

(1) A metal foil excellent in electrical contact stability characterized by having a surface roughness wherein the ratio Ra/Sm between the arithmetic average of roughness Ra and the average interval Sm of concavities and convexities is 0.001 or more, which average values are obtained by measuring the roughness in the direction in which the average interval Sm of the concavities and convexities on the surface is smallest.

(2) A metal foil excellent in electrical contact stability according to the item (1), characterized in that the material of the metal foil is stainless steel or phosphor bronze.

BEST MODE FOR CARRYING OUT THE INVENTION

A metal foil 0.3 mm or less in thickness which is cold tempered to provide springiness is generally used as a material for electrical contacts. A keypad or a tactile switch is constructed by cutting out components into a disc shape from the metal foil material, forming them into a concave shape like a dish, then placing them on circuit patterns of a copper foil printed on a substrate plated with gold, silver and/or nickel, so that a circuit is closed when each of the disc-shaped components is pressed, and thereafter, mounting resin covers, rubber parts and casing components thereon for the purpose of insulating operator's fingers from the electrically conductive portions and making the touch feel smooth.

In case of cable terminals too, the connecting method is changing from the conventional screw type to a press-in, ribbon-shaped spring type, considering the convenience of connecting work. In either of the electrical contacts, electrical contact stability is one of the essential factors for suppressing noise generation from a contact portion and correctly transmitting electric signals to other components. In particular, in the field of electronic devices, where weight reduction and miniaturization are advancing rapidly, it is imperative to realize the stability of electrical contacts even when a thinner metal is used, for electrical contacts, with a light pressing force.

The present inventors established, as a method of evaluating such technical conditions, a method for measuring the voltage fluctuation of a contact between a spherical electrical contact element, which was prepared by machining a tip of a copper rod 3 mm in diameter into a spherical shape and plating it with Ni in a strike plating bath and then with gold, and a metal foil, while the copper contact element was pressed onto the foil under a load of 5 g.

In this method, an electrical circuit is formed using a dry cell as a power source and the metal foil as the ground and arranging a voltage control circuit and a resistance so that the potential of the spherical electrical contact element is 1.8 V when it does not contact with the foil. When the spherical electrical contact element touches the metal foil under the above condition, since the electrical resistance of the contact point is nearly zero and most of the applied voltage is imposed on the resistance located between the voltage control circuit and the spherical electrical contact element, the potential of the spherical electrical contact element becomes nearly equal to that of the ground.

Here, if the electrical contact stability of the metal foil is high, the potential of the spherical electrical contact element does not fluctuate, staying virtually at 0 V, but, if its electrical contact stability is poor, the reading of the potential changes from time to time, and spike-like voltage changes or the like may occur caused by the slight vibrations or the like from outside. In case of a digital circuit, the latter situation may make a signal meant to be one Lo potential signal transmitted to an electronic circuit appear to be multiple signals, and, in case of an audio circuit or a transmission circuit, it may generate noise and cause troubles.

The test method is applied under the condition of a light pressing force, which condition is severer than the condition of a contact employed in an actual electronic device. However, the present inventors judged that the condition is appropriate for evaluating the reliability of a metal foil capable of realizing good electrical contact stability without plating, which metal foil is prepared by controlling the surface shape.

In the evaluation of a metal foil by the test method, a metal foil showing a potential fluctuation of 50 mV or less when a contact is closed is classified as good (marked with ○), and that showing a potential fluctuation exceeding 50 mV as poor (×). As explained in the example below, when the ratio of an arithmetic average of roughness Ra to an average interval Sm of the concavities and convexities is 0.001 or more, contact failure does not occur and, when it is below 0.001, contact failure may occur.

EXAMPLE

The present invention is explained in more detail based on the examples hereafter.

Table 1 shows the evaluation results of the metal foils produced by using stainless steel as the base material, and Table 2 those of the metal foils produced by using phosphor bronze as the base material. In the tables, the arithmetic average of roughness Ra specified in JIS B 0601-1994, the average interval Sm of the concavities and convexities and the ratio Ra/Sm between them are listed as the results of measuring the surface roughness of each material.

The surface roughness was measured by using a contact type surface roughness measurement apparatus (SURFCOM 1400A-3D manufactured by Tokyo Seimitsu Co., Ltd.) and provided the data of concavities and convexities along a length of 4 mm by scanning the surface with a contact probe in the direction in which the average interval Sm of the concavities and convexities was smallest. Based on the measurement results, the above evaluation was carried out.

The surface unevenness was given to a material by a rolling work with dull-finished rolls, embossed rolls or the like, a grinding work with an abrasive, a coil-grinding work with silicon carbide paper, or a surface sweeping work by blasting. Any one of these methods is suitable for mass production and cost reduction.

From Tables 1 and 2, it can be seen that, when Ra/Sm is 0.001 or more, the material has good electrical contact stability. Therefore, the validity and effectiveness of the present invention are verified.

Here, the arithmetic average of roughness Ra is a value corresponding to the height of the unevenness of a surface based on the definition, and the average interval Sm of concavities and convexities is interpreted as a value corresponding to the periodicity of the unevenness. This shows the validity of the basic idea of the present invention that good electrical contact stability can be realized by increasing the density of contact points per unit area even though an oxide film is allowed to exist to some extent.

TABLE 1

| Material | Surface treatment | Ra (μm) | Sm (μm) | Ra/Sm | Electrical contact stability | Remarks |
|---|---|---|---|---|---|---|
| Stainless steel | Nil | 0.05 | 177 | 0.0003 | x | Comparative example |
| Stainless steel | Gold plating | 0.06 | 100 | 0.0006 | ○ | Comparative example (by conventional specification) |
| Stainless steel | Silver plating | 0.05 | 120 | 0.0004 | ○ | Comparative example (by conventional specification) |
| Stainless steel | Nickel plating | 0.07 | 80 | 0.0009 | ○ | Comparative example (by conventional specification) |
| Stainless steel | Dull-finished roll | 0.51 | 85 | 0.0060 | ○ | Invented example |
| Stainless steel | Dull-finished roll | 0.08 | 75 | 0.0011 | ○ | Invented example |
| Stainless steel | Dull-finished roll | 0.15 | 125 | 0.0012 | ○ | Invented example |
| Stainless steel | Dull-finished roll | 0.07 | 100 | 0.0007 | x | Comparative example |
| Stainless steel | Dull-finished roll | 0.81 | 80 | 0.0101 | ○ | Invented example |
| Stainless steel | Dull-finished roll | 0.45 | 70 | 0.0064 | ○ | Invented example |
| Stainless steel | Dull-finished roll | 0.25 | 55 | 0.0045 | ○ | Invented example |
| Stainless steel | Dull-finished roll | 0.09 | 95 | 0.0009 | x | Comparative example |
| Stainless steel | Dull-finished roll | 0.35 | 120 | 0.0029 | ○ | Invented example |
| Stainless steel | Surface grinding | 0.37 | 63 | 0.0059 | ○ | Invented example |
| Stainless steel | Surface grinding | 0.25 | 100 | 0.0025 | ○ | Invented example |
| Stainless steel | Surface grinding | 0.15 | 153 | 0.0010 | x | Comparative example |
| Stainless steel | Surface grinding | 0.18 | 56 | 0.0032 | ○ | Invented example |
| Stainless steel | Surface grinding | 0.19 | 66 | 0.0029 | ○ | Invented example |
| Stainless steel | Surface grinding | 0.18 | 256 | 0.0007 | x | Comparative example |
| Stainless steel | Surface grinding | 1.05 | 245 | 0.0043 | ○ | Invented example |
| Stainless steel | Surface grinding | 0.21 | 50.7 | 0.0041 | ○ | Invented example |
| Stainless steel | Surface grinding | 0.86 | 150 | 0.0057 | ○ | Invented example |
| Stainless steel | Surface grinding | 0.56 | 200 | 0.0028 | ○ | Invented example |
| Stainless steel | Blasting | 1.5 | 300 | 0.0050 | ○ | Invented example |
| Stainless steel | Blasting | 0.9 | 277 | 0.0032 | ○ | Invented example |
| Stainless steel | Blasting | 0.5 | 269 | 0.0019 | ○ | Invented example |
| Stainless steel | Blasting | 0.2 | 250 | 0.0008 | x | Comparative example |
| Stainless steel | Blasting | 0.2 | 150 | 0.0013 | ○ | Invented example |
| Stainless steel | Blasting | 0.3 | 145 | 0.0021 | ○ | Invented example |
| Stainless steel | Blasting | 1.86 | 200 | 0.0093 | ○ | Invented example |
| Stainless steel | Blasting | 0.1 | 150 | 0.0007 | x | Comparative example |

TABLE 2

| Material | Surface treatment | Ra (μm) | Sm (μm) | Ra/Sm | Electrical contact stability | Remarks |
|---|---|---|---|---|---|---|
| Phosphor bronze | Nil | 0.05 | 185 | 0.0003 | x | Comparative example |
| Phosphor bronze | Gold plating | 0.07 | 135 | 0.0005 | ○ | Comparative example (by conventional specification) |
| Phosphor bronze | Silver plating | 0.08 | 120 | 0.0007 | ○ | Comparative example (by conventional specification) |
| Phosphor bronze | Nickel plating | 0.07 | 80 | 0.0009 | ○ | Comparative example (by conventional specification) |
| Phosphor bronze | Dull-finished roll | 0.08 | 85 | 0.0009 | x | Comparative example |
| Phosphor bronze | Dull-finished roll | 1.2 | 75 | 0.0160 | ○ | Invented example |
| Phosphor bronze | Dull-finished roll | 0.35 | 135 | 0.0026 | ○ | Invented example |
| Phosphor bronze | Dull-finished roll | 0.07 | 125 | 0.0006 | x | Comparative example |
| Phosphor bronze | Dull-finished roll | 0.95 | 95 | 0.0100 | ○ | Invented example |
| Phosphor bronze | Dull-finished roll | 0.55 | 258 | 0.0021 | ○ | Invented example |
| Phosphor bronze | Dull-finished roll | 0.65 | 55 | 0.0118 | ○ | Invented example |
| Phosphor bronze | Dull-finished roll | 0.08 | 112 | 0.0007 | x | Comparative example |
| Phosphor bronze | Dull-finished roll | 0.25 | 135 | 0.0019 | ○ | Invented example |
| Phosphor bronze | Surface grinding | 0.45 | 63 | 0.0071 | ○ | Invented example |
| Phosphor bronze | Surface grinding | 0.36 | 125 | 0.0029 | ○ | Invented example |
| Phosphor bronze | Surface grinding | 0.18 | 250 | 0.0007 | x | Comparative example |
| Phosphor bronze | Surface grinding | 0.17 | 66 | 0.0026 | ○ | Invented example |
| Phosphor bronze | Surface grinding | 0.66 | 70 | 0.0094 | ○ | Invented example |
| Phosphor bronze | Surface grinding | 0.25 | 248 | 0.0010 | ○ | Invented example |
| Phosphor bronze | Surface grinding | 1.2 | 268 | 0.0045 | ○ | Invented example |
| Phosphor bronze | Surface grinding | 0.35 | 60 | 0.0058 | ○ | Invented example |
| Phosphor bronze | Surface grinding | 0.95 | 250 | 0.0038 | ○ | Invented example |
| Phosphor bronze | Surface grinding | 0.35 | 400 | 0.0009 | x | Comparative example |
| Phosphor bronze | Blasting | 0.25 | 300 | 0.0008 | x | Comparative example |
| Phosphor bronze | Blasting | 0.36 | 277 | 0.0013 | ○ | Invented example |
| Phosphor bronze | Blasting | 0.36 | 279 | 0.0013 | ○ | Invented example |
| Phosphor bronze | Blasting | 0.06 | 150 | 0.0004 | x | Comparative example |
| Phosphor bronze | Blasting | 0.3 | 160 | 0.0019 | ○ | Invented example |

TABLE 2-continued

| Material | Surface treatment | Ra (μm) | Sm (μm) | Ra/Sm | Electrical contact stability | Remarks |
|---|---|---|---|---|---|---|
| Phosphor bronze | Blasting | 0.45 | 125 | 0.0036 | o | Invented example |
| Phosphor bronze | Blasting | 1.99 | 356 | 0.0056 | o | Invented example |
| Phosphor bronze | Blasting | 0.2 | 256 | 0.0008 | x | Comparative example |

INDUSTRIAL APPLICABILITY

As explained above, the present invention makes it possible to improve the electrical contact stability of switch elements and terminals for electronic device products, wherein technological development in weight reduction and miniaturization is advancing, without applying plating processes, and to provide a metal foil excellent in electrical contact stability. Therefore, the present invention contributes to the cost reduction of electronic devices and, as such, it is extremely valuable industrially.

What is claimed is:

1. A metal foil excellent in electrical contact stability characterized by having a surface roughness wherein the ratio Ra/Sm between the arithmetic average of roughness Ra and the average interval Sm of concavities and convexities is 0.001 or more, which average values are obtained by measuring the roughness in the direction in which the average interval Sm of the concavities and convexities on the surface is smallest, and wherein the metal foil is made of either stainless steel or phosphor bronze.

* * * * *